(12) United States Patent
Berghammer (10) Patent No.: US 9,738,465 B2
(45) Date of Patent: Aug. 22, 2017

(54) TRAILER

(71) Applicant: LR Intralogistik GmbH, Wörth an der Isar (DE)

(72) Inventor: Fritz Berghammer, Landshut (DE)

(73) Assignee: LR Intralogistik GmbH, Woerth an der Isar (DE)

( * ) Notice: Subject to any disclaimer, the term of this patent is extended or adjusted under 35 U.S.C. 154(b) by 0 days.

(21) Appl. No.: 14/892,687

(22) PCT Filed: Feb. 24, 2014

(86) PCT No.: PCT/EP2014/053513
§ 371 (c)(1),
(2) Date: Nov. 20, 2015

(87) PCT Pub. No.: WO2014/187581
PCT Pub. Date: Nov. 27, 2014

(65) Prior Publication Data
US 2016/0101948 A1    Apr. 14, 2016

(30) Foreign Application Priority Data

May 21, 2013 (DE) .................... 20 2013 102 199 U (51) Int. Cl.
*B65G 67/24* (2006.01)
*B60P 1/02* (2006.01)
(Continued)

(52) U.S. Cl.
CPC ............... *B65G 67/24* (2013.01); *B60P 1/02* (2013.01); *B62D 63/08* (2013.01); *B65G 69/24* (2013.01);
(Continued)

(58) Field of Classification Search
CPC . B65G 67/24; B65G 69/24; B60P 1/02; B60P 3/07; B62D 63/08; B62D 63/062
(Continued)

(56) References Cited

U.S. PATENT DOCUMENTS 3,021,795 A * 2/1962 Hayba .................... A47B 53/02
                                                              104/251
3,486,642 A * 12/1969 Plefka .................... B21D 37/14
                                                              100/144
(Continued)

FOREIGN PATENT DOCUMENTS

DE        202009001933 U1    6/2009
DE        102011080857 A1    6/2012
(Continued)

*Primary Examiner* — Kaitlin Joerger
(74) *Attorney, Agent, or Firm* — The Webb Law Firm (57) ABSTRACT

A trailer includes a load-bearing carrier frame which is guided on an undercarriage and includes a lateral longitudinal member and two cross members protruding at right angles from either end thereof. Between these, a central member is secured to the longitudinal member, parallel to the cross members, and a loading opening is formed opposite said longitudinal member. A lifting device is arranged, for mutual height adjustment purposes, between the carrier frame and the undercarriage. A load-clasping gripping unit may be arranged on the central member and may be displaced in the transverse direction between the longitudinal member and the loading opening.

8 Claims, 7 Drawing Sheets

(51) Int. Cl.
*B62D 63/08* (2006.01)
*B65G 69/24* (2006.01)

(52) U.S. Cl.
CPC ....... *B62B 2202/90* (2013.01); *B62B 2203/74* (2013.01)

(58) Field of Classification Search
USPC ........................................ 414/352, 469, 498
See application file for complete search history.

(56) References Cited

U.S. PATENT DOCUMENTS

| | | | | |
|---|---|---|---|---|
| 4,120,411 A | * | 10/1978 | Johnson | B62B 3/10 104/235 |
| 4,632,626 A | * | 12/1986 | O'Shea | A01D 87/126 280/43.23 |
| 5,403,143 A | * | 4/1995 | Ito | B60P 1/00 414/352 |
| 6,799,933 B1 | * | 10/2004 | Wasinger | B65D 88/129 414/352 |
| 6,866,463 B2 | * | 3/2005 | Riordan | B62B 3/04 280/79.3 |
| 8,235,642 B2 | * | 8/2012 | Camaly | B62D 63/08 414/339 |
| 2014/0265241 A1 | * | 9/2014 | Korhonen | B60D 1/54 280/408 |
| 2014/0366783 A1 | * | 12/2014 | Kosonen | B65D 19/0002 108/51.11 |
| 2015/0239383 A1 | * | 8/2015 | Neubauer | B60P 1/02 414/495 |
| 2015/0251583 A1 | * | 9/2015 | Ziemann | B62D 53/005 414/495 |

FOREIGN PATENT DOCUMENTS

| | | |
|---|---|---|
| DE | 202013100729 U1 | 5/2013 |
| EP | 0620183 A2 | 10/1994 |
| EP | 2161182 A3 | 8/2010 |
| EP | 2311673 A2 | 4/2011 |
| EP | 2487067 A2 | 8/2012 |

\* cited by examiner

TRAILER

CROSS REFERENCE TO RELATED APPLICATIONS

This application is a United States national phase of International Application No. PCT/EP2014/053513, filed Feb. 24, 2014, which claims the benefit of German Patent Application No. DE 202013102199.7, filed May 21, 2013. The disclosure of each of these documents is hereby incorporated in its entirety by reference.

BACKGROUND OF THE INVENTION

Field of the Invention

This invention relates to a trailer with a load-bearing carrier frame which is guided on an undercarriage.

Description of Related Art

Trailers of this type are used with increasing frequency in the automated manufacture of products, e.g. for building motor vehicles, where the individual work stations are supplied with the necessary components by means of trailers. A tractor vehicle tows a train consisting of a plurality of trailers on which the necessary individual parts are transported. These parts are generally carried on pallets or in wire mesh crates, which for their part, are moved over short distances on trolleys.

The invention is based on trailers with carrier frames, the height of which relative to the undercarriage can be adjusted by means of integrated lifting devices, to prevent the guide rollers of trolleys from rolling on the floor and negatively influencing the traction behavior during transport inside the plant. Examples of trailers of this type of the prior art are described in European Patent EP 2 161 182 B1, with a carrier frame that is in the shape of an E when viewed from overhead, and Utility Model DE 20 2009 001 933 U1 with a carrier frame that is in the shape of a C when viewed from overhead.

EP 2 311 673 B1 describes a trailer with an E-frame for a train of trailers in which, on the end of the cross member which is connected with the lateral longitudinal member, a slide is located. The purpose of this slide is to initiate a telescoping ejection movement. The slide is not able to push the load out all the way or to return the load into the carrier frame.

SUMMARY OF THE INVENTION

The object of the invention is to make possible a simplified loading and unloading for both systems (E-frame and C-frame), which does not require muscle power and relieves the operator of the need to perform essentially all the heavy physical labor.

This object is accomplished by a trailer as described in the present disclosure, according to which, on the central member which protrudes from the longitudinal member parallel to the two cross members, a gripping unit is located which can be moved in the transverse direction between the longitudinal member and the loading opening opposite it and thereby clasps the load to be picked up or delivered.

After the trailer train has stopped at a station to be serviced next to a trolley or a transfer station for a wire mesh crate, the gripping unit moves toward the side and thereby reaches underneath the trolley or the wire mesh crate, so that it can then pull the wire mesh crate, when the carrier frame is lowered, onto the two cross members of the carrier frame. This process takes place automatically and requires no intervention on the part of an operator.

The process takes place in the reverse direction at an unloading station in which the trolley or the wire mesh crate is pushed out of the trailer by means of the gripping unit.

In one aspect of the disclosure, the gripping unit includes at least one endless circulating chain from which drive fingers protrude which engage the load to be received or delivered. For this purpose, another feature of the invention teaches that the chain circulates in a housing that can travel on the central member at a right angle to the longitudinal member. It is thereby advantageous if the housing is fastened to a guide rail and forms a carriage with the guide rail, which can be extended and retracted telescopically on a carrier rail connected with the central member.

In one advantageous aspect of the disclosure, the gripping unit is attached to a saddle that sits on the central member and is fastened to it. This solution is suitable primarily for carrier frames that are in the shape of an E when viewed from overhead as described in EP 2 161 182, on which, underneath the central member, there is an undercarriage with two wheels mounted laterally on an axle and the lifting device, which has at least one hydraulic cylinder supported between the axle and the central member.

Alternatively, the transverse member can be formed by two parallel lifting forks which sit adjustably with their ends opposite the load opening of the C-shaped carrier frame on the upper edge of the longitudinal member, as illustrated and explained in detail in DE 20 2009 001 933 U1. The saddle can be fastened to the two lifting forks which are pushed together onto the longitudinal member and in this manner function as cross members.

If the load to be picked up and delivered that is transported by the trailer is not a trolley but a wire mesh crate, it is advantageous to install a roller train on each of the two cross members which receives the load from a roller train at the same height or delivers the load to a roller train at the same height.

BRIEF DESCRIPTION OF THE DRAWINGS

The invention is explained below with reference to two exemplary aspects which are illustrated in the accompanying drawings, in which.

DESCRIPTION OF THE DISCLOSURE

FIGS. 1 to 6, 7, and 8 show, in a first exemplary application, a trailer 10 with an E-shaped carrier frame 12 a trolley 14 is clasped and picked up. The carrier frame 12 is as illustrated in EP 2 161 182 B1 or in EP 311 673 B1 and includes a lateral longitudinal member 16, from both ends of which two transverse members 18 protrude. Both the longitudinal member 16 as well as the two transverse members 18 have an L-shaped profile in cross section with an encircling horizontal edge flange 20 on which the load is supported. In this case the trolley 14 is in the fully on-board position illustrated in FIG. 6.

Between the two cross members 18, parallel to the cross members 18 on the longitudinal member 16, a central member 22 is fastened, underneath which there is an undercarriage 24 with two wheels 28 mounted laterally on a rigid axle 26. As already explained in EP 2 311 673 B1 and not illustrated again here, between the central member 22 and the rigid axle 26 of the undercarriage 24 there is a lifting device that can raise and lower the carrier frame 12 relative to the rigid axle 26 of the undercarriage 24.

In FIGS. 1 to 6, the carrier frame 12 of the trailer 10 is in its lowered position, in which it can take the trolley 14 on board. For this purpose, on both sides of a saddle 30 which is fastened to the central member 22 by means of bolts or screws 32, a gripping unit 34 is attached. This gripping unit has a carrier rail 36 fastened laterally to the saddle 30 on which a guide rail 38 can be displaced telescopically. The drive unit required for this purpose can be installed for both gripping units 34 jointly under the saddle 30, which is not illustrated in any further detail.

Fastened to each of the guide rails 38 is a housing 62 with an endless circulating chain 40 from which drive fingers 42 protrude outward. The guide rail 38, together with the chain conveyor including the chain 40 and the housing 62, forms a telescopically extendable carriage 44.

In the transfer process illustrated in FIGS. 1 to 6, in front of the loading opening 46 of the carrier frame 12 opposite the longitudinal member 16, there is a trolley 14 which is to be taken on board. In the lowered position of the carrier frame 12, the two gripping units 34 are then extended through the loading opening 46, wherein on both sides the carriage 44 formed by the guide rail 38 and housing 62 with chain conveyors is extended telescopically until it clasps the trolley 14 underneath the frame 48. In this fully extended position of the carriage 44, the drive fingers 42 of the chain 40 reach into the longitudinal spar 50 of the frame of the trolley 14 opposite the longitudinal member 16, and as the chain runs, pull it into the carrier frame 12, wherein the guide rollers 52 of the trolley 14 roll on the floor. In the fully retracted position of the trolley 14, the drive motor of the two chains 40 is de-energized by means of a limit switch (not shown) and simultaneously, by means of the lifting device (also not shown), the carrier frame 12 of the trailer 10 is raised so that the guide rollers 52 of the trolley 14 are disengaged from the floor.

For the unloading of the trailer 10, the steps described above are performed in reverse order.

Figure 1:
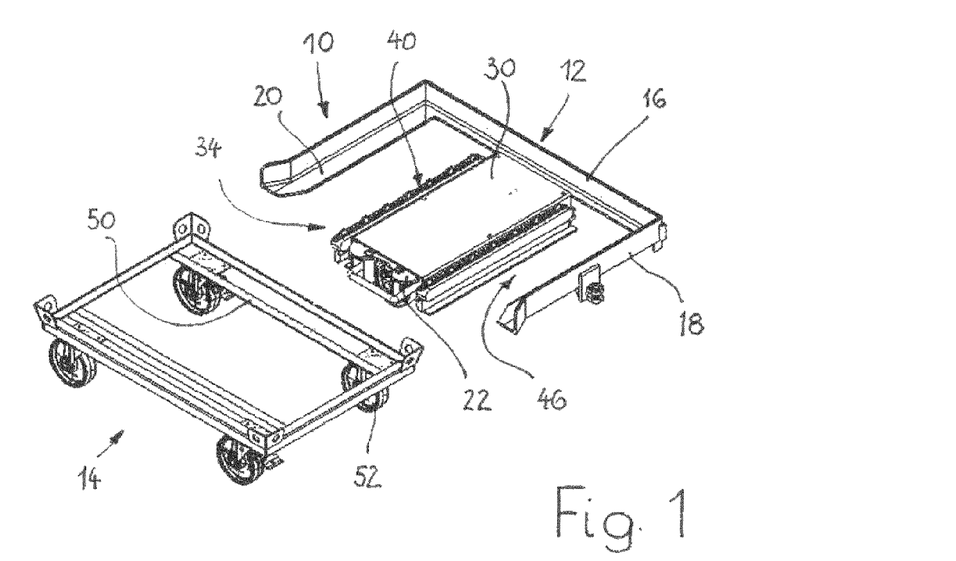
FIG. 1 is a perspective view of a first exemplary aspect of the disclosure with a telescopically extended gripping unit for clasping a trolley.
Figure 2:
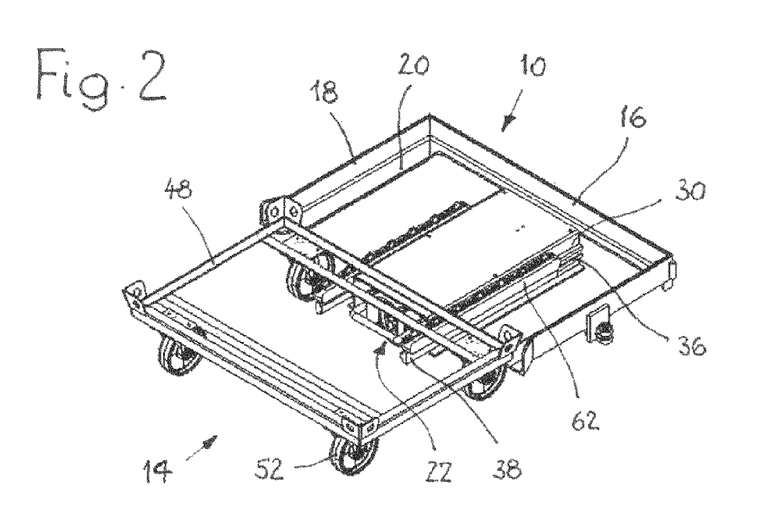
FIGS. 2 to 6 are perspective views showing additional positions of the gripping unit of FIG. 1 until the trolley is fully loaded on board into the carrier frame.
Figure 3:
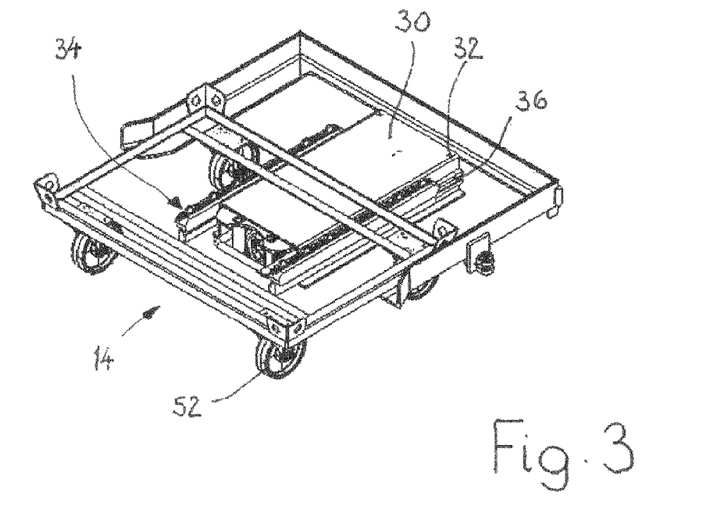
Figure 4:
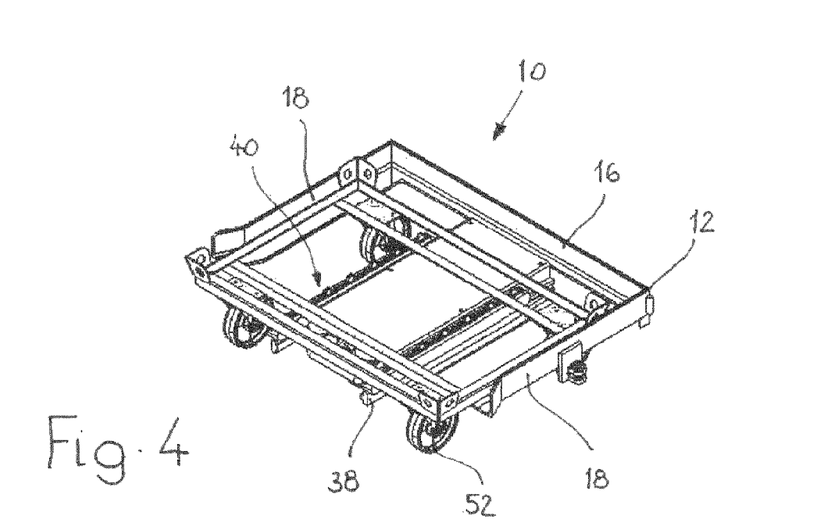
Figure 5:
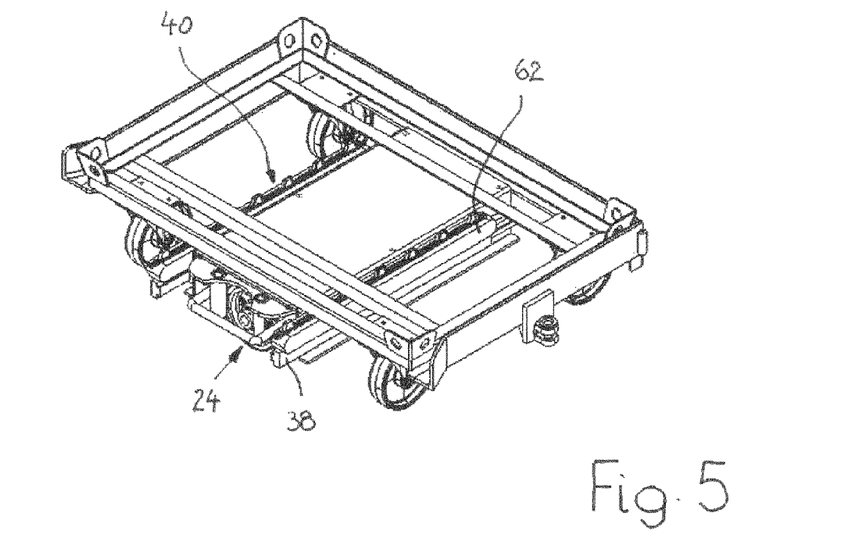
Figure 6:
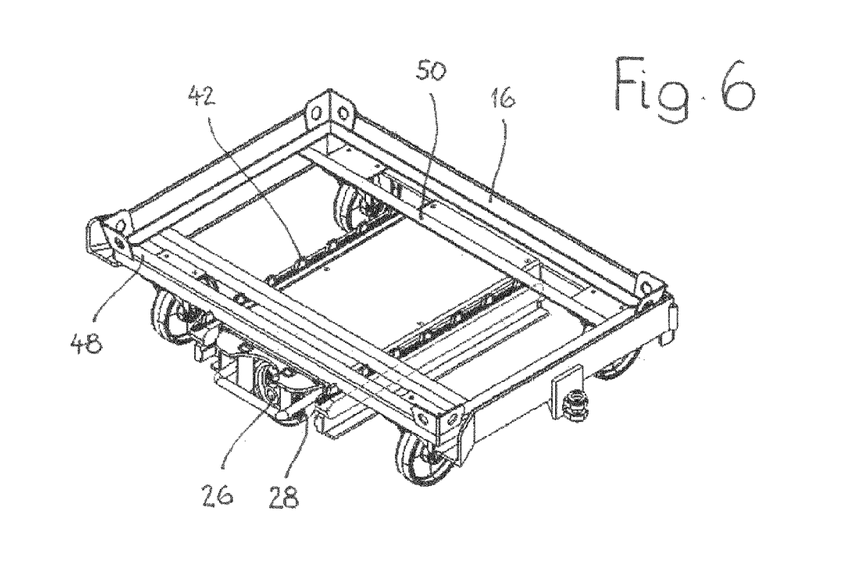
Figure 7:
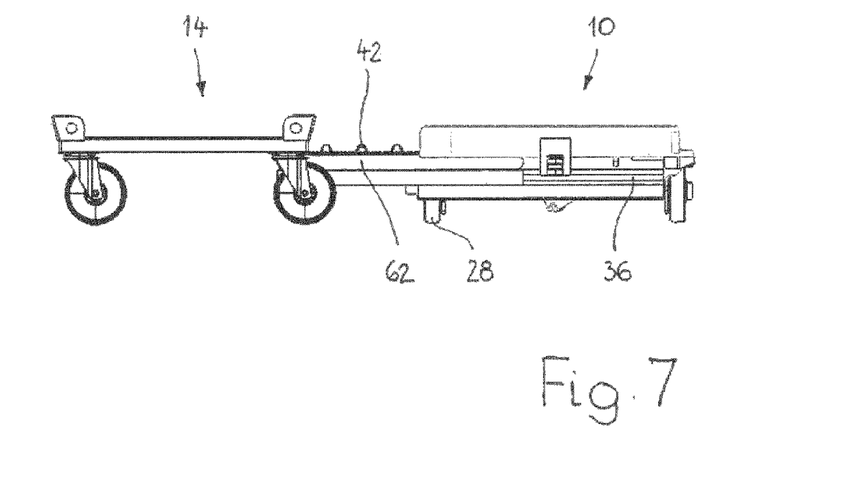
FIG. 7 is a side view of a gripping unit with an endless circulating chain as a trolley is pushed off.
Figure 8:
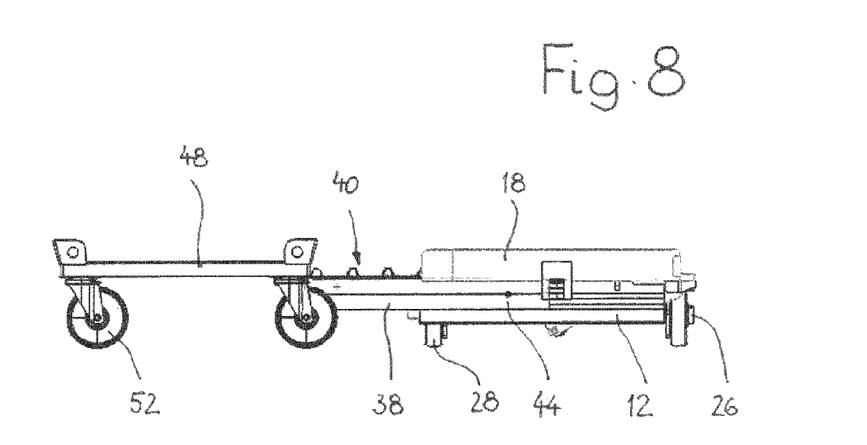
FIG. 8 is a side view as the carrier is pulled into the carrier frame.
Figure 9:
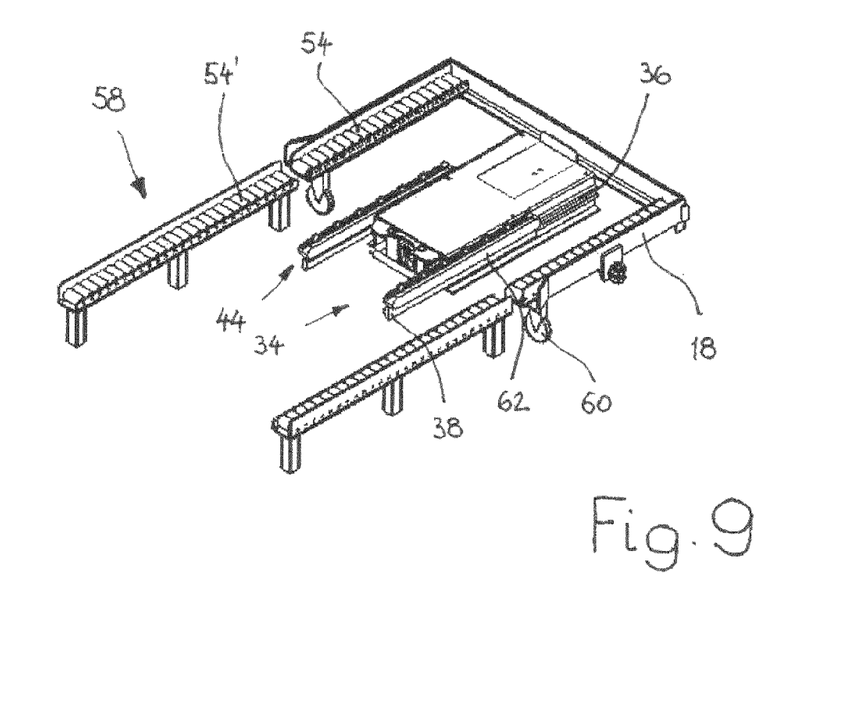
FIG. 9 is a perspective view of one variant of the disclosure in which the two transverse members have a roller train to hold a wire mesh crate or a pallet, whereby the gripping unit is telescopically extended.
Figure 10:
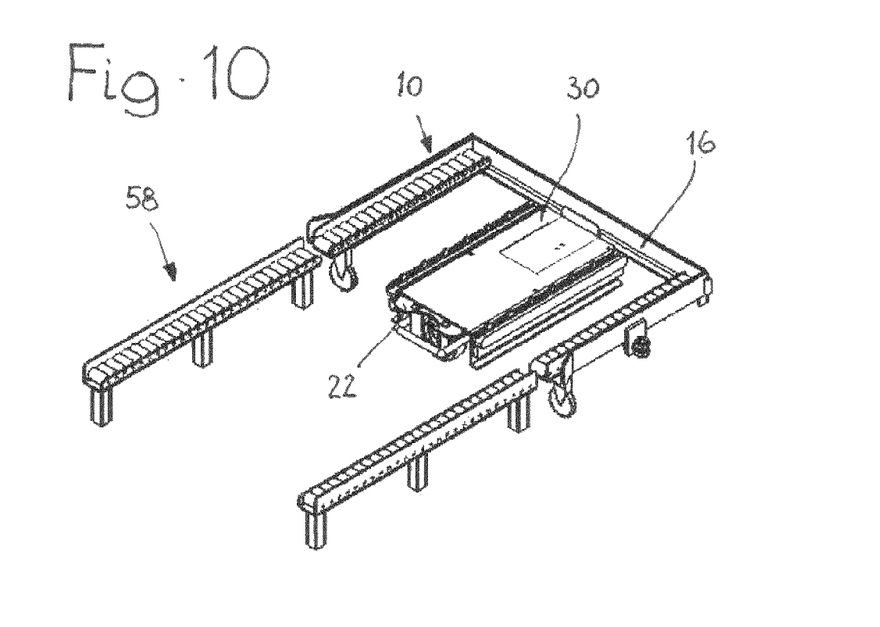
FIG. 10 is a perspective view of the unit illustrated in FIG. 9 with a retracted gripping unit.
Figure 11:
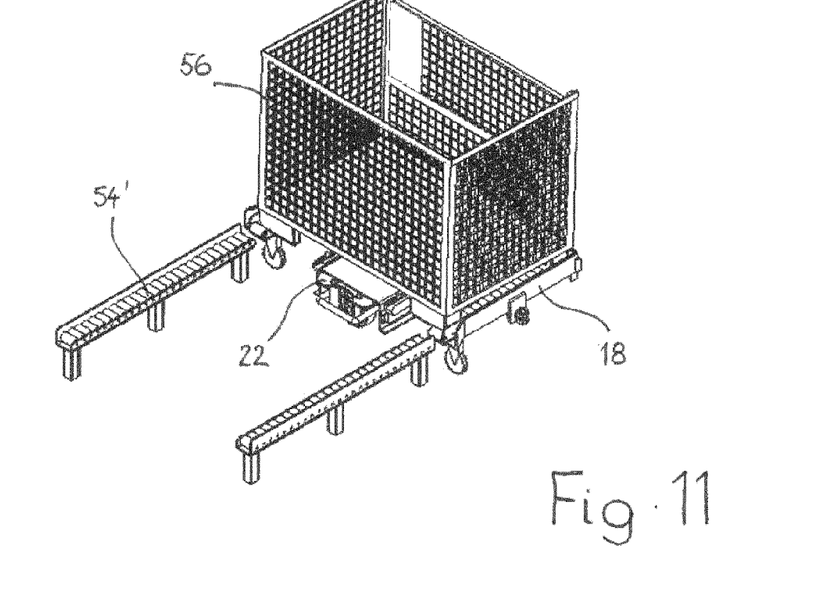
FIG. 11 is a perspective view of the unit illustrated in FIG. 10 with wire mesh crates before the wire mesh crates are pushed off by the gripping unit.
Figure 12:
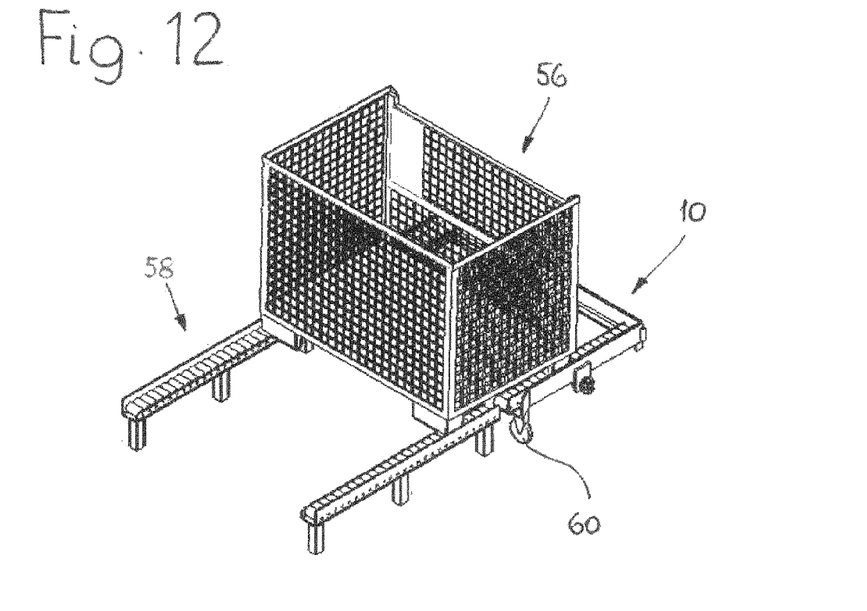
FIGS. 12 to 14 are perspective views illustrating the subsequent steps during the delivery of the wire mesh crate to a stationary transfer station at the same height.
Figure 13:
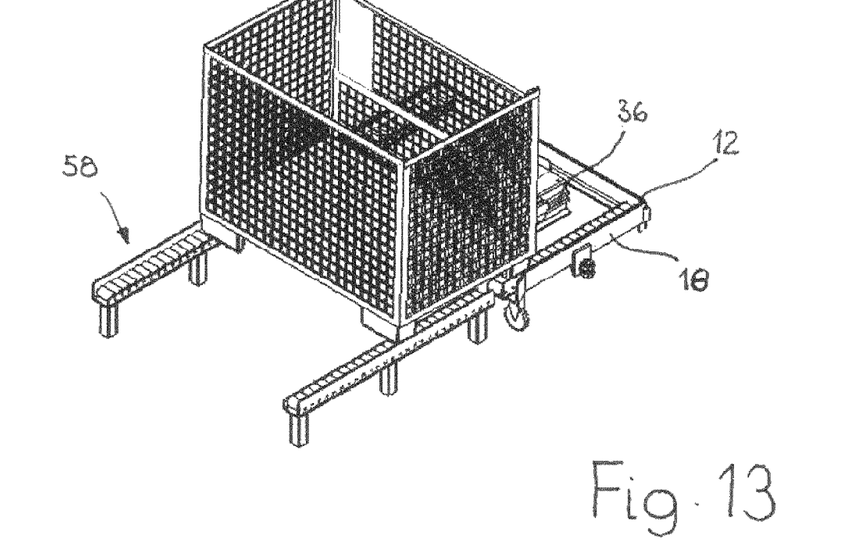
Figure 14:
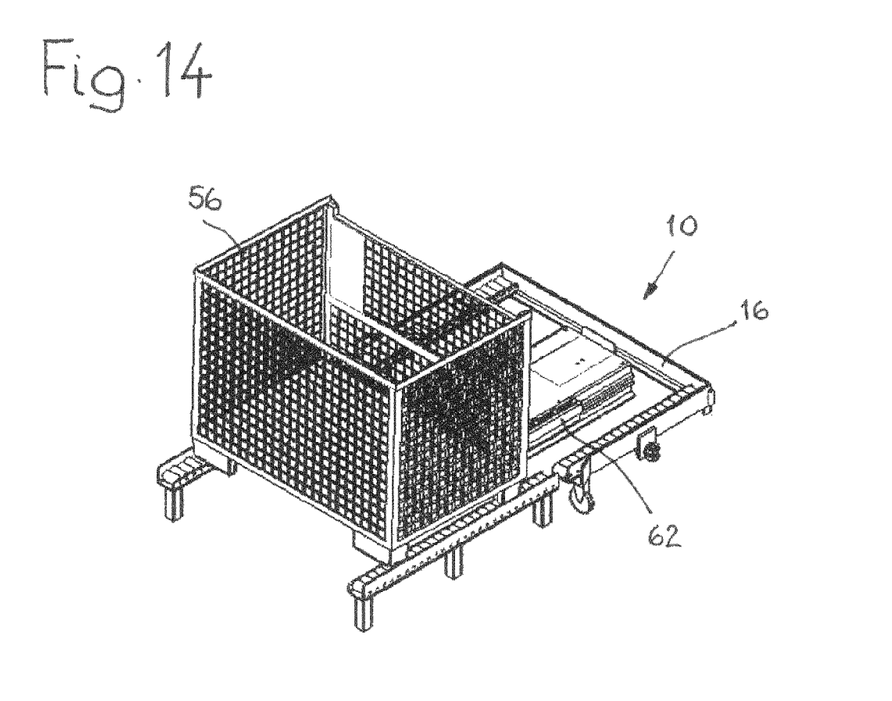

The side views in FIGS. 7 and 8 show that the carrier rail 36 attached on each side of the saddle 30 each have a guide rail 38 which can be displaced in the transverse direction. Together with the housing 62, the guide rails 38 form a carriage 44 which can be retracted and extended on the carrier rail 36 in the transverse direction.

As shown in DE 20 2009 001 933, two lifting forks may be moved together centrally in an above mentioned C-shaped carrier frame to form a central member to which the gripping unit 34 can be attached.

FIGS. 9 to 14 show an additional aspect of the disclosure, according to which the two cross members 18 of the carrier frame 12 are each equipped with a roller train 54. These roller trains 54 are used for the reception or delivery, supported by the gripping units 34, of a wire mesh crate, a pallet or similar item which is not, as in the exemplary aspect explained above, equipped with guide rollers. In this case, to take on board or deliver a wire mesh crate 56, there is a stationary transfer station 58 which consists of two roller trains 54' parallel to each other which in the transfer position lie at the same, lowered height of the cross members 18 of the carrier frame 12. To prevent a tipping of the carrier frame 12 around the axle 26 of the undercarriage 24, support rollers 60 are attached to both transverse carriers 18 of the carrier frame 12.

It will be readily appreciated by those skilled in the art that modifications may be made to the invention without departing from the concepts disclosed in the foregoing description. Accordingly, the particular embodiments described in detail here are illustrative only and are not limiting to the scope of the invention, which is to be given the full breadth of the appended claims and any and all equivalents thereof.

The invention claimed is:

1. A trailer, comprising:
a load-bearing carrier frame guided on an undercarriage, the carrier frame comprising a lateral longitudinal member and two cross members protruding at right angles from either end thereof, between which and parallel to the cross members, a central member is fastened to the longitudinal member, and a loading opening is formed opposite said longitudinal member,
wherein a lifting device for a mutual height adjustment is located between the carrier frame and the undercarriage,
wherein on the central member there is a load-clasping gripping unit located on the central member so that the gripping unit can be displaced in the transverse direction between the longitudinal member and the loading opening,
wherein the gripping unit comprises at least one endless circulating chain from which drive fingers protrude,
wherein the chain circulates in a housing which is displaced on the central member at a right angle to the longitudinal member, and
wherein the housing, together with a guide rail that receives the housing, forms a carriage that can be telescopically retracted and extended on a carrier rail that is connected with the central member.

2. The trailer as claimed in claim 1, wherein the gripping unit is attached to a saddle that sits on the central member and is fastened to the central member.

3. The trailer as claimed in claim 1, wherein, on each side of the saddle, a carriage is displaced telescopically on a carrier rail.

4. The trailer as claimed in claim 1, wherein a roller train is attached to each of the two cross members.

5. The trailer as claimed in claim 1, wherein underneath the central member are the undercarriage, with two wheels mounted laterally on an axle, and the lifting device, which has at least one hydraulic cylinder supported between the axle and the central member.

6. The trailer as claimed in claim 5, wherein support rollers are attached to the cross members of the carrier frame.

7. The trailer as claimed in claim 1, wherein the central member is formed by two parallel lifting forks, which sit with their ends opposite the loading opening of the carrier frame seen in an overhead view on the upper end of the longitudinal member, wherein the carrier frame is C-shaped.

8. The trailer as claimed in claim 7, wherein the two cross members of the carrier frame support the lifting device on the undercarriage located underneath the carrier frame so that the carrier frame's height can be adjusted by means of hydraulic cylinders.

\* \* \* \* \*